(12) United States Patent
Contreras et al.

(10) Patent No.: US 8,705,323 B2
(45) Date of Patent: *Apr. 22, 2014

(54) TAR TEMPERATURE SENSOR HAVING FASTER RESPONSE TIME

(71) Applicant: HGST Netherlands B.V., Amsterdam (NL)

(72) Inventors: John T. Contreras, Palo Alto, CA (US);
Fu-ying Huang, San Jose, CA (US);
Lidu Huang, Danville, CA (US);
Takuya Matsumoto, Sunnyvale, CA (US); Erhard Schreck, San Jose, CA (US); Barry C. Stipe, San Jose, CA (US)

(73) Assignee: HGST Netherlands B.V., Amsterdamn (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/725,140

(22) Filed: Dec. 21, 2012

(65) Prior Publication Data

US 2013/0107680 A1  May 2, 2013

Related U.S. Application Data

(63) Continuation-in-part of application No. 13/285,769, filed on Oct. 31, 2011.

(51) Int. Cl.
*G11B 11/00* (2006.01)
(52) U.S. Cl.
USPC .......... 369/13.32; 369/13.13; 369/13.17; 369/13.33; 360/59
(58) Field of Classification Search
None
See application file for complete search history.

(56) References Cited

U.S. PATENT DOCUMENTS

| 5,625,616 A | 4/1997 | Koike et al. |
| 6,671,232 B1 | 12/2003 | Stupp |

(Continued)

FOREIGN PATENT DOCUMENTS

| JP | 7182721 | 7/1995 |
| JP | 2002232073 | 8/2002 |
| JP | 2003297029 | 10/2003 |

OTHER PUBLICATIONS

Hu, Shengbin et al., Laser irradiation and its effects on heat transfer in heat assisted magnetic recording, Review of Scientific Instruments, Mar. 27, 2006, American Institute of Physics, Melville, New York, United States.

(Continued)

*Primary Examiner* — Adam R Giesy
*Assistant Examiner* — Henok Heyi
(74) *Attorney, Agent, or Firm* — Patterson & Sheridan, LLP

(57) ABSTRACT

TAR enable write heads may use a plasmonic device (e.g., an optical transducer) which uses electromagnetic energy generated from a laser to heat the magnetic media. However, as the temperature of the plasmonic device rises, the likelihood of stressing the material of the device or other materials of the head near the plasmonic device increases. Accordingly, the write head may include a temperature sensor proximate to the plasmonic device. In one embodiment, the resistance of the temperature sensor may change according to the temperature of the plasmonic device. Based on the measured resistance of the temperature sensor, a sensing circuit may adjust the power of the laser, and thus, prevent the stressing of the materials. Moreover, the thermal coupling between the temperature sensor and a heat sink connected to the plasmonic device may be improved by moving elements associated with the sensing circuit closer to a heat sink.

12 Claims, 16 Drawing Sheets

(56) References Cited

U.S. PATENT DOCUMENTS

| | | | |
|---|---|---|---|
| 6,922,383 B2 | 7/2005 | Sakata et al. | |
| 7,006,336 B2 | 2/2006 | Coffey et al. | |
| 7,170,714 B2 | 1/2007 | Coffey et al. | |
| 7,589,928 B2 | 9/2009 | Roy et al. | |
| 7,596,295 B2 | 9/2009 | Hasegawa | |
| 7,880,995 B2 | 2/2011 | Lille | |
| 2002/0101812 A1* | 8/2002 | Wickramasinghe et al. | ... 369/99 |
| 2005/0249250 A1 | 11/2005 | Tsai et al. | |
| 2005/0265409 A1 | 12/2005 | Tsao et al. | |
| 2009/0040645 A1 | 2/2009 | Shimazawa et al. | |
| 2009/0225464 A1 | 9/2009 | Juang et al. | |
| 2011/0128828 A1 | 6/2011 | Naniwa et al. | |
| 2011/0205863 A1 | 8/2011 | Zhao et al. | |
| 2011/0317527 A1 | 12/2011 | Wang et al. | |
| 2012/0008230 A1* | 1/2012 | Nishioka et al. | ............ 360/59 |
| 2012/0045662 A1 | 2/2012 | Zou et al. | |
| 2012/0051196 A1 | 3/2012 | Grobis et al. | |
| 2012/0082015 A1 | 4/2012 | Grobis et al. | |
| 2012/0120519 A1* | 5/2012 | Kunkel et al. | ............ 360/59 |
| 2012/0201108 A1* | 8/2012 | Zheng et al. | ......... 369/13.26 |
| 2013/0050867 A1* | 2/2013 | Yamane et al. | ............ 360/59 |

OTHER PUBLICATIONS

U.S. Appl. No. 13/285,769, entitled Temperature Sensor in a Thermally Assisted Magnetic Recording Head, filed Oct. 31, 2011.

* cited by examiner

TAR TEMPERATURE SENSOR HAVING FASTER RESPONSE TIME

CROSS-REFERENCE TO RELATED APPLICATIONS

This application is a continuation-in-part of co-pending U.S. patent application Ser. No. 13/285,769, filed Oct. 31, 2011, and entitled "Temperature Sensor in a Thermally Assisted Magnetic Recording Head" which is herein incorporated by reference.

BACKGROUND OF THE INVENTION

1. Field of the Invention

Embodiments of the present invention generally relate to data storage systems, and more particularly, to write heads with near-field transducers for thermally assisted recording.

2. Description of the Related Art

Higher storage bit densities in magnetic media used in disk drives have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" upon cooling the media to ambient temperatures. This technique is broadly referred to as "thermally assisted (magnetic) recording" (TAR or TAMR), "energy assisted magnetic recording" (EAMR), or "heat-assisted magnetic recording" (HAMR) which are used interchangeably herein. It can be applied to longitudinal and perpendicular recording systems as well as "bit patterned media". Heating of the media surface has been accomplished by a number of techniques such as focused laser beams or near-field optical sources.

SUMMARY OF THE INVENTION

One embodiment disclosed herein includes a head of a disk drive. The head includes an optical transducer configured to heat a magnetic media proximate to the head and a first heat sink configured to transfer heat away from the optical transducer. The head also includes a temperature sensor configured to thermally couple to the optical transducer, where the temperature sensor and the optical transducer are spaced apart by a first distance along an axis that extends between the temperature sensor and the optical transducer. The head includes a first lead connected to the temperature sensor, where the first lead is configured to conduct a current flowing through the temperature sensor, and wherein the first lead one of (i) contacts the first heat sink and (ii) is separated from the first heat sink by a second distance along the axis, wherein the second distance is shorter than the first distance.

Another embodiment disclosed herein includes a method that includes transmitting optical energy from a laser to an optical transducer located in a head of a disk drive. The method also includes measuring an electrical resistance of a temperature sensor thermally coupled to the optical transducer using a first lead connected to the temperature sensor where the electrical resistance correlates to a temperature of the sensor. Moreover, the temperature sensor and the optical transducer are spaced apart by a first distance along an axis that extends between the temperature sensor and the optical transducer. Further still, the first lead one of (i) contacts a first heat sink that transfers heat away from the optical transducer and (ii) is separated from the first heat sink by a second distance along the axis, where the second distance is shorter than the first distance. The method includes adjusting the optical energy transmitted by the laser based on the measured electrical resistance.

Another embodiment disclosed herein includes a head of a disk drive. The head includes an optical transducer configured to heat a magnetic media proximate to the head and a heat sink thermally coupled to the optical transducer. The head also includes a temperature sensor configured to thermally couple to the optical transducer, wherein the temperature sensor and the optical transducer are spaced apart by a first distance and wherein the temperature sensor directly contacts the heat sink.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention is generally related to providing a signal for driving a heating element in a TAR or HAMR enabled disk storage system that includes a near-field transducer, or more generally, an optical transducer or near-field optical source for further focusing the beamspot of a laser onto a magnetic media, thereby heating the media. The storage system includes a temperature sensor proximate to the near-field transducer which provides a feedback loop for the laser driver to adjust the power of the laser.

An Exemplary Hard Drive

Figure 1A:
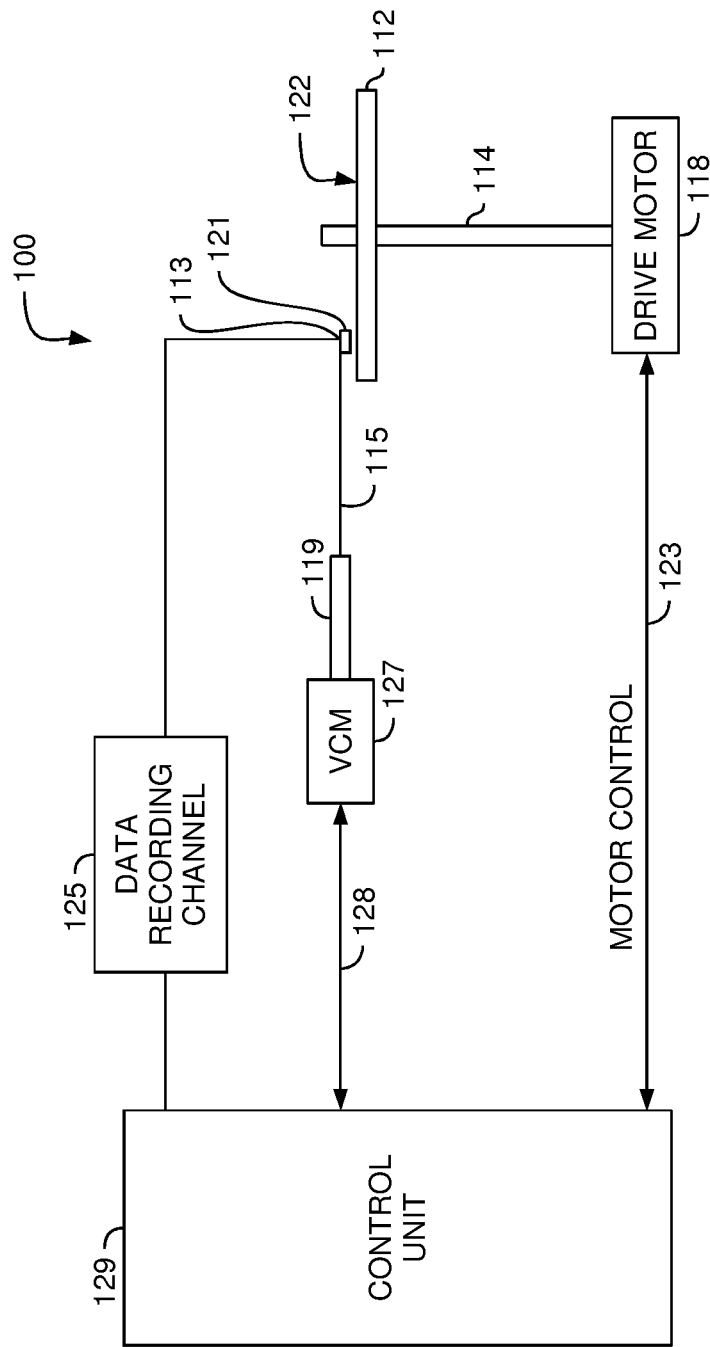
FIGS. 1A-1B illustrate a disk drive system, according to embodiments of the invention.

FIG. 1A illustrates a disk drive embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1A may be a voice coil motor (VCM). The VCM comprises a coil movable within a fixed magnetic field, the direction and speed of the coil movements being controlled by the motor current signals supplied by control unit 129.

During operation of a TAR or HAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation. The radiation source heats up the high-coercivity data bits so that the write elements of the magnetic head assemblies 121 may correctly magnetize the data bits.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

Figure 1B:
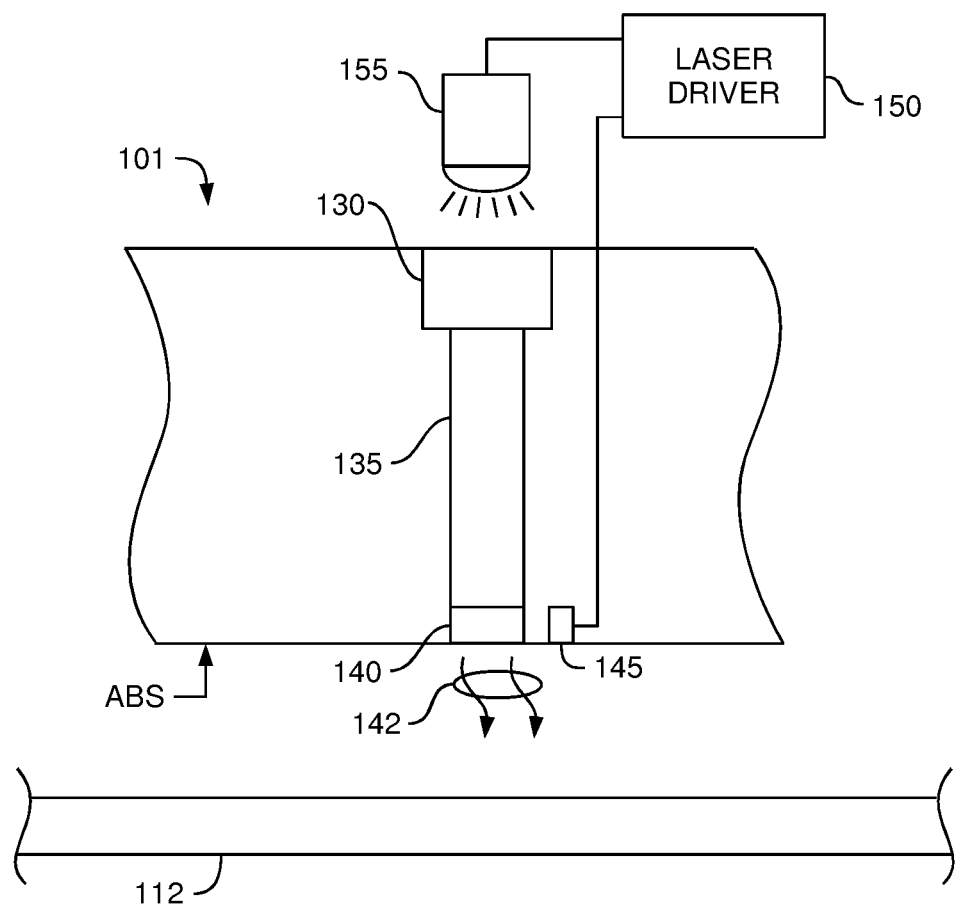

FIG. 1B is a cross sectional schematic of a TAR enabled write head, according to one embodiment of the invention. The head 101 is operatively attached to a laser 155 that is powered by a laser driver 150. The laser 155 may be placed directly on the head 101 or radiation may be delivered from a laser 155 located off the slider through an optical fiber or waveguide. Similarly, the laser driver 150 circuitry may be located on the slider 113 or on a system-on-chip (SOC) associated with the disk drive 100 such as control unit 129. The head 101 includes a spot-size converter 130 for focusing the radiation transmitted by the laser 155 into the waveguide 135. In another embodiment, the disk drive 100 may include one or more lens for focusing the beamspot of the laser 155 before the emitted radiation reaches the spot-size converter 130. The waveguide 135 is a channel that transmits the radiation through the height of the head 101 to the near-field transducer 140—e.g., a plasmonic device—which is located at or near the air-bearing surface (ABS). The near-field transducer 140 further focuses the beamspot to avoid heating neighboring tracks of data on the disk 112—i.e., creates a beamspot much smaller than the diffraction limit. As shown by arrows 142, this optical energy emits from the near-field transducer 140 to the surface of the disk 112 below the ABS of the head 101. The embodiments herein are not limited to any particular type of near-field transducer and may operate with, for example, either a c-aperature, e-antenna plasmonic near-field source, or any other shaped transducer known in the art.

A temperature sensor 145 may be located proximate to the near-field transducer 140. Because the near-field transducer 140 is unable to transfer all of the radiation transmitted by the waveguide 135 to the magnetic media, at least a portion of the optical energy heats the head 101 itself. The temperature sensor 145 may be a thermistor or resistance temperature detector (RTD) where the electrical resistance of the material comprising the sensor 145 changes as the temperature of the material varies (either inversely or directly). The temperature sensor 145 may be electrically coupled to the laser driver 150 or some other control device to measure the electrical resistance of the sensor 145. This change may then be used as a feedback control signal to adjust the power of the laser 155. For example, the laser driver 150 may provide a constant voltage across the temperature sensor 145. If the measured current begins to decrease—e.g., the electrical resistance of the sensor 145 increases—then the laser driver 150 may decrease the power of the laser 155 to decrease the temperature of the temperature sensor 145 and presumably other components of the head 101. This feedback control permits the disk drive 100 to perform TAR at a sufficient temperature without damaging the head 101 by, for example, pole-tip protrusion or metal diffusion of the near-field transducer.

TAR Head with Temperature Sensor

Figure 2:
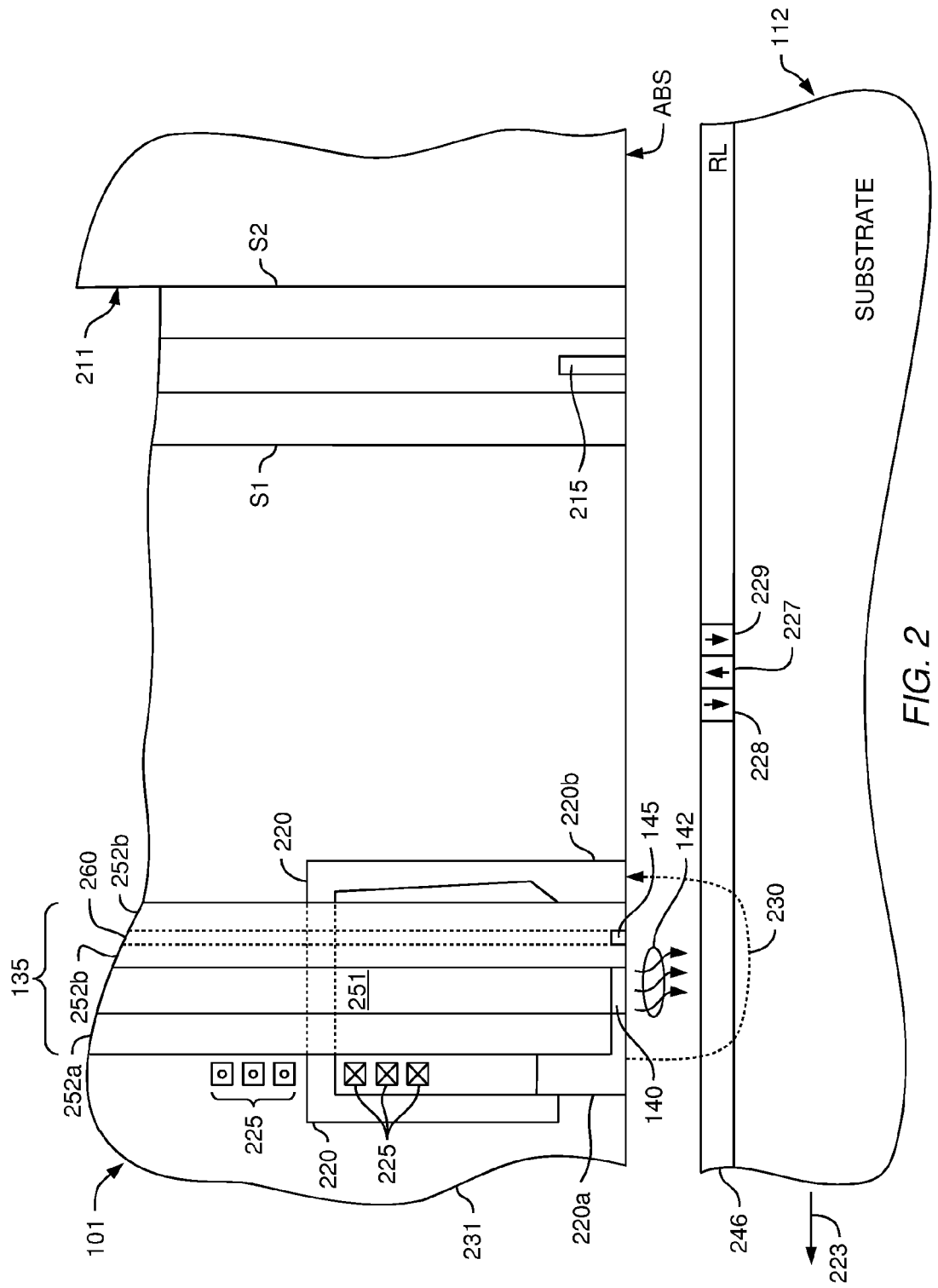
FIG. 2 illustrates a cross-sectional schematic diagram of a TAR enabled head of a disk drive, according to one embodiment of the invention.

FIG. 2 illustrates a cross-sectional schematic diagram of a TAR enabled disk drive, according to one embodiment of the invention. Specifically, FIG. 2 illustrates a portion of an air-bearing head 101 and associated perpendicular magnetic recording disk 112 for a TAR disk drive which uses an optical channel or waveguide 135 for directing heat to the disk. The disk 112 includes a substrate and a perpendicular magnetic recording layer (RL) 246. In one embodiment, the disk 112 may include an optional "soft" or relatively low-coercivity magnetically permeable underlayer (SUL). However, the SUL is not required for a TAR disk drive 100.

The RL 246 may be any media with perpendicular magnetic anisotropy, such as a cobalt-chromium (CoCr) alloy granular layer grown on a special growth-enhancing sublayer, or a multilayer of alternating films of Co with films of platinum (Pt) or palladium (Pd). The RL 246 may also be an $L1_0$ ordered alloy such as FePt or FeNiPt. The disk 112 may also include a protective overcoat (not shown) over the RL 246.

The head 101 has a trailing surface 211 and an ABS surface oriented generally perpendicular to trailing surface 211. The head 101 is typically formed of a composite material, such as a composite of alumina/titanium-carbide ($Al_2O_3$/TiC), and supports the read and write elements which are typically formed as a series of thin films and structures on the trailing surface 211. The disk 112 may spin in a direction 223 away from the trailing surface and towards the other layers of the head 101. The ABS is the recording-layer-facing surface of the slider that faces the disk 112. Note that FIG. 2 is not drawn to scale because of the difficulty in showing the very small features and, for the sake of clarity, omits structures from the head such as spacing and insulating layers.

The head 101 includes a conventional magnetoresistive read pole (or sensor) 215 located between shields S1 and S2, and a conventional perpendicular write head that includes a magnetic yoke 220 with a write pole 220*a*, a return pole 220*b*, and an electrically conductive coil 225. The write pole 220*a* is formed of conventional high-moment material, such as a NiFe or FeCoNi alloy. The write coil 225 is wrapped around the yoke 220 with the electrical current directions being shown as into the paper by the coil cross-sections marked with an "X" and out of the paper by the coil cross-sections marked with a solid circle. When write-current pulses are directed through the coil 225, the write pole 220*a* directs magnetic flux, represented by arrow 230, to the RL 246. Further, the magnetic flux 230 continues through the substrate or a SUL layer before arriving at the return pole 220*b*. However, the invention is not limited to the structure and material discussed above. For example, the coil 225 may be a helical coil or the write pole 220*a* may include a wrap-around shield. Further, the present invention may operate with any recording head that can perform the functions discussed herein.

The head 101 may also include a waveguide 135 with a near-field transducer 140 near or at the ABS. As shown, the waveguide 135 and near-field transducer 140 extend through the yoke 220 and are located between the write pole 220*a* and the return pole 220*b*. As noted by the ghosted lines, the yoke 220 may continuously connect the write pole 220*a* to the return pole 220*b*. The waveguide 135 and near-field transducer 140 may be fabricated at any location such that the near-field transducer 140 passes over a portion of the spinning magnetic disk 112 prior to that portion passing below the write pole 220*a*. Specifically, the waveguide 135 may be located between shield S2 and return pole 220*b*, or between the write pole 220*b* and the outer face 231 of the head 101 (if the disk 112 rotates opposite of the direction 223 shown).

While writing to the disk 112, the RL 246 moves relative to the head 101 in the direction shown by arrow 223. In TAR, the optical energy 142 emitted from the transducer 140 temporarily lowers the coercivity ($H_c$) of the RL 246 so that the magnetic recording regions 227, 228, 229 may be oriented by the write field from write pole 220*a*. The magnetic recording regions 227, 228, 229 become oriented by the write field if the write field ($H_w$) is greater than $H_c$. After a region of the RL 246 in the data track has been exposed to $H_w$ from the write pole 220*a* and the resulting heat from the optical energy 142 from the near-field transducer 140, the region's temperature falls below the Curie temperature and the data associated with the magnetic orientations is recorded. Specifically, the transitions between recorded regions (such as previously recorded regions 227, 228, and 229) represent written data "bits" that can be read by the read pole 215. In this manner, the near-field transducer 140 uses the optical energy 142 to heat the RL layer 246 and lower its magnetic coercivity.

The waveguide 135 is formed of a core material 251 such as a high-index-of-refraction dielectric material that is transmissive to radiation at the wavelength of the laser radiation source—e.g., around 780 nm. Typical radiation-transmissive materials include, for example, $TiO_2$ and $Ta_2O_5$. The radiation-transmissive core material 251 is surrounded by a cladding material 252*a,b* that has a lower refractive index than the core material 251 and is transmissive to radiation at the wavelength of the laser radiation source—e.g., laser 155. Typical cladding materials include $SiO_2$ and $Al_2O_3$.

The head 101 may also include a temperature sensor 145 proximate to the near-field transducer 140. The temperature sensor 145 measures the heat that may emanate from the transducer 140 that does not transfer into the magnetic disk 112. In one embodiment, because the head temperature is proportional to the laser power, the temperature sensor 145 may be used to maintain a constant laser power. Alternatively or additionally, the temperature sensor 145 may also be used to protect the head 101 from damage. In some instances, the heat transferred from the transducer 140 to the head 101 may be significant enough to interfere with the normal read/write functions of the head 101 or damage the head 101. The temperature sensor 145 may be connected to at least one sensor lead (or wire pad) 260 that provides an electrical connection to a connector pad (not shown) located at the top of the head 101—i.e., the side opposite the ABS. From there, a wire may electrically connect the temperature sensor 145 to the laser driver 150 as shown in FIG. 1B.

In one embodiment, the temperature sensor 145 is embedded in cladding 252*a* or 252*b*. In another embodiment, the sensor 145 and sensor lead 260 may both be embedded in either cladding 252*a* or 252*b*. Alternatively, the sensor 145 and sensor lead 260 may be located between cladding 252*b* and the write pole 220*a* or between cladding 252*a* and the return pole 220*b*.

In one embodiment, the temperature sensor 145 and sensor lead 260 are surrounded by a non-magnetic and insulative material. In one embodiment, the sensor 145 may not be located in any cladding 252 but may be embedded in a separate non-magnetic and insulative material that is located between the waveguide 135 and the return pole 220b.

In one embodiment, the temperature sensor 145 may be located outside of the boundaries of the yoke 220. For example, the temperature sensor may be between the return pole 220b and the shield 51 or to the left of the write pole 220a—i.e., a side of the write pole 220a that is opposite of the side facing the read pole 215 faces the temperature sensor 145.

Figure 3:
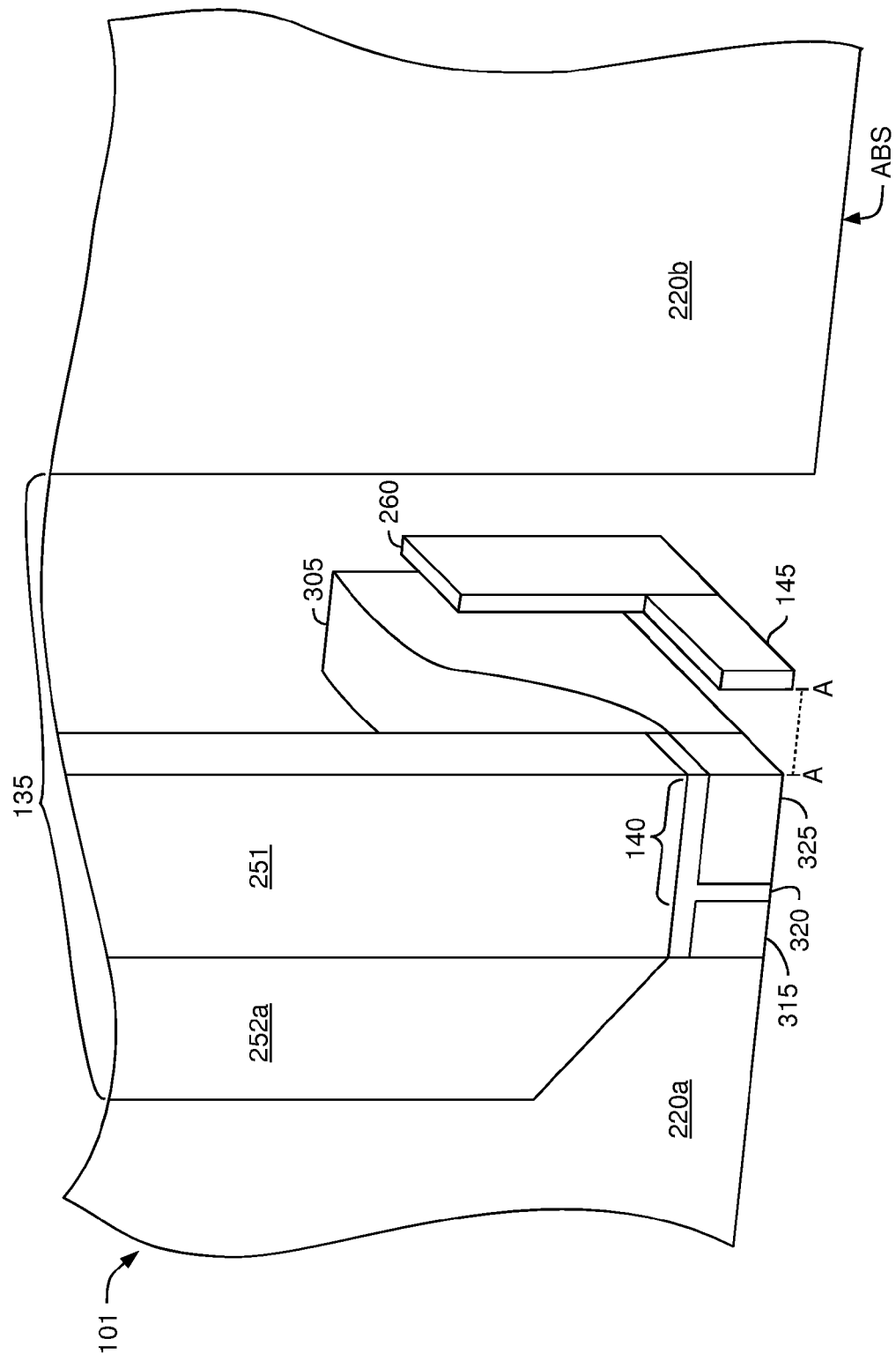
FIG. 3 illustrates a cross-sectional schematic diagram of a TAR enabled head, according to one embodiment of the invention.

FIG. 3 illustrates a cross-sectional schematic diagram of a TAR enabled head, according to one embodiment of the invention. As shown, this portion of the head 101 includes the waveguide 135 but with cladding 252b (and any cladding on the back-side of the head 101) removed to better illustrate the details of the temperature sensor 145, sensor lead 260, and heat sink 305. The near-field transducer 140 may be directly or thermally coupled to the heat sink 305 for removing excess heat from the transducer 140. Because FIG. 3 is a cross-section of head 101, there may be another heat sink located opposite the heat sink 305 depicted. The return pole 220b may be between the temperature sensor 145 and the shield layers S1, S2 or read pole (not shown).

In one embodiment, the electrical resistance of the temperature sensor 145 changes according to its temperature. For example, depending on the material chosen, the electrical resistance of the sensor 145 may increase as its temperature decreases. Or the electrical resistance may increase when its temperature increases. Suitable materials for the temperatures sensor 145 include Ta, Pt, Au, Rh, NiFe, or alloys thereof. In one embodiment, a constant voltage (or a constant current) may be applied across the sensor. The resulting current can be plotted according to time to determine changes in the resistance of the temperature sensor 145. This change may be used to increase or decrease the radiation emitted from the laser 155.

In one embodiment, to electrically connect the temperature sensor 145 to a monitoring circuit (e.g., laser driver 150) the head 101 may have sensor leads 260 connected to opposite sides of the temperature sensor 145. For clarity, in FIG. 3 the sensor lead located opposite the sensor lead 260 is omitted. In one embodiment, the electrical resistance of the material comprising the sensor lead 260 is less dependent on temperature than the material used for the temperature sensor 145. That is, the electrical resistance of the sensor lead 260 is less sensitive to temperature fluctuations than the temperature sensor 145. In one embodiment, the sensor leads 260 may comprise Ru. However, in one embodiment, the material of the sensor lead 260 may be the same as the material used for the temperature sensor 145.

Although not shown in FIG. 3, the sensor lead 260 may extend away from the ABS until it reaches a connector pad located at the top of the head 101. The pads 260 may flare or widen and include Cu or Ta leads.

The core 251 may terminate at the near-field transducer 140. The transducer 140 at least includes an antenna 325 and dielectric 320. In one embodiment, the transducer may also include a pole lip 315. The antenna 325 may be Cu, Au, Ag, or alloys thereof. The dielectric 320 is an aperture or opening that may be filled with radiation-transmissive material such as $SiO_2$ or other dielectric material. In one embodiment, the dielectric 320 may comprise of the same material as the cladding 252. The pole lip 315 may comprise of Ni, Co, Fe, or some combination or alloy thereof. The structure of the transducer 140 may be similar to the near-field optical source discussed in a US Pat. App. 2010/0163521 Balamane et al. which is herein incorporated by reference. The transducer 140 uses the antenna 325 and dielectric 320 to further focus the beamspot onto the magnetic media 112.

Figure 4A:
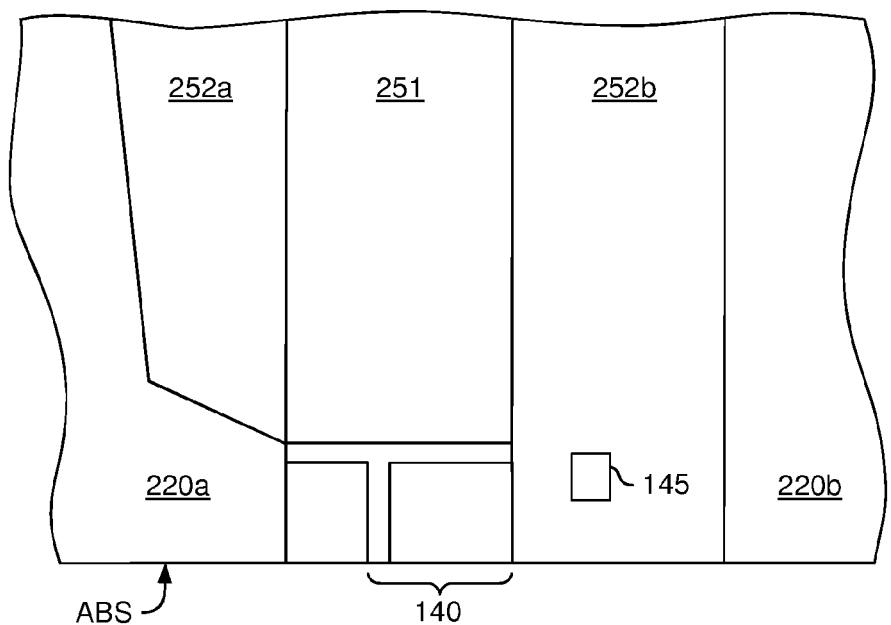
FIGS. 4A-4B illustrate a cross-sectional schematic diagram of a TAR enabled head, according to embodiments of the invention.
Figure 4B:
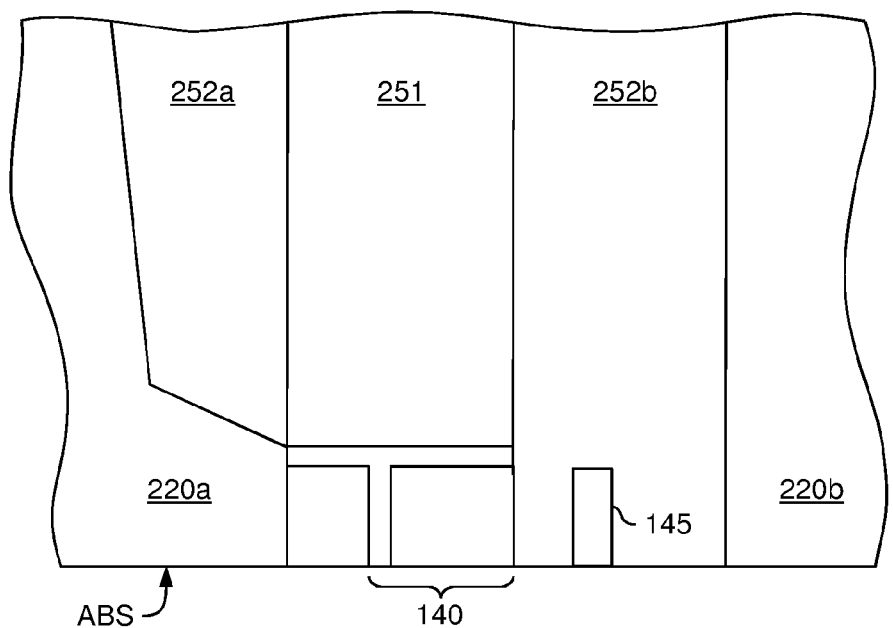

FIGS. 4A-B illustrate a cross-sectional schematic diagram of a TAR enabled head, according to embodiments of the invention. In FIG. 4A, the cladding 252b is shown with the sensor 145 embedded within. This electrically isolates the sensor 145, permitting a current to flow through the sensor to detect a change of resistance in the temperature sensor 145. Although not shown, the sensor lead 260 may be embedded in the cladding 252b or in a separate dielectric material.

In one embodiment, the temperature sensor 145 is located at least 5 nm away from the ABS. In one embodiment, the sensor 145 is at least 15 nm away from the ABS. In another embodiment, the sensor 145 is at least 20 nm away from the ABS. In another embodiment, the sensor is at least 15 nm or 20 nm away from the ABS but no more than 60 nm away from the ABS. FIG. 4B illustrates, however, that the temperature sensor 145 may be located on the ABS.

Analytical Data

Figure 5:
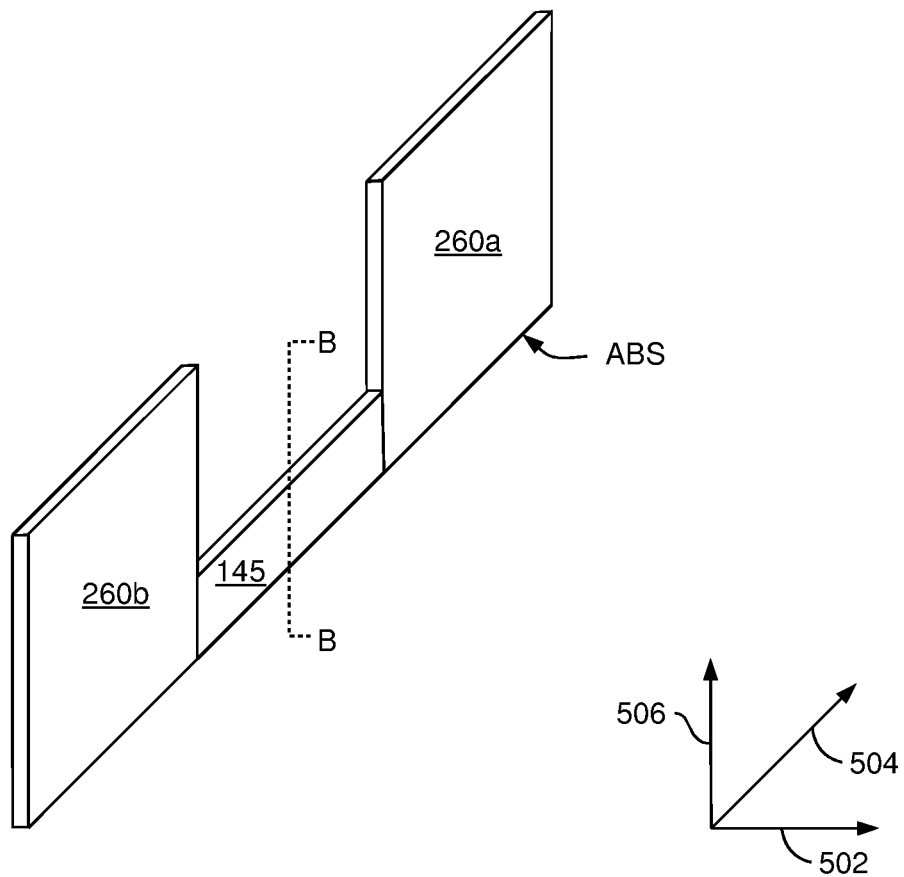
FIG. 5 is a schematic of a temperature sensor with sensor leads, according to one embodiment of the invention.

FIG. 5 is a schematic of a temperature sensor with sensor leads, according to one embodiment of the invention. As shown, the temperature sensor 145 is connected to two sensor leads 260a,b on opposite ends. However, the sensor leads 260a,b may be connected to the temperature sensor 145 in whatever manner that permits an electric current to flow through at least a portion of the temperature sensor 145 when a voltage potential is applied across the sensor leads 260a,b. The dotted line labeled B-B illustrates the cross sectional view that is shown in FIG. 3 of the sensor 145 and sensor leads 260a,b.

Moreover, as used herein, arrow 502 corresponds to the direction of the thickness, arrow 504 corresponds to the direction of the length, and arrow 506 corresponds to the direction of the height of the structures illustrate in the three-dimensional FIGS. 3 and 5.

Figure 6A:
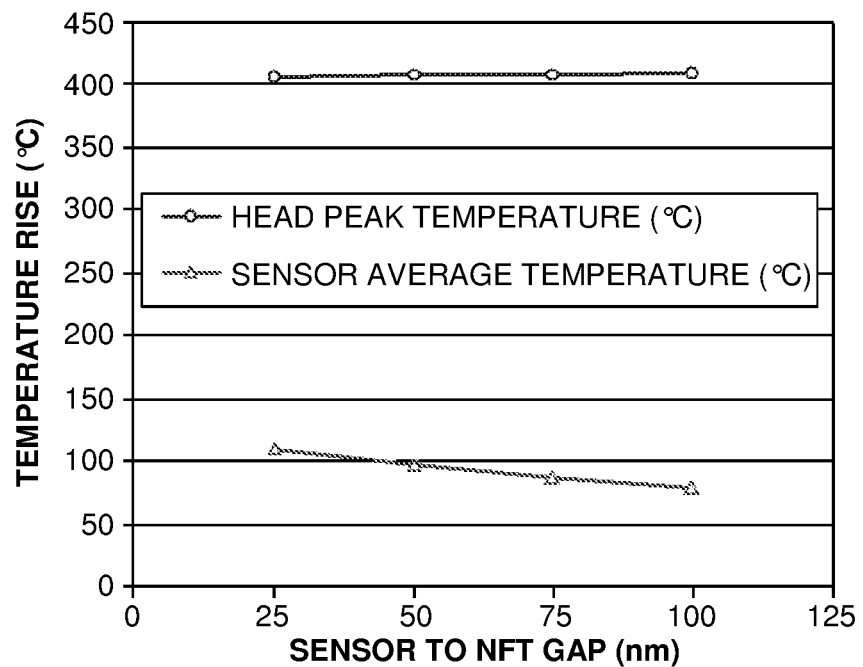
FIGS. 6A-6B are graphs illustrating analytical data related to the gap between a near-field transducer and a temperature sensor, according to embodiments of the invention.
Figure 6B:
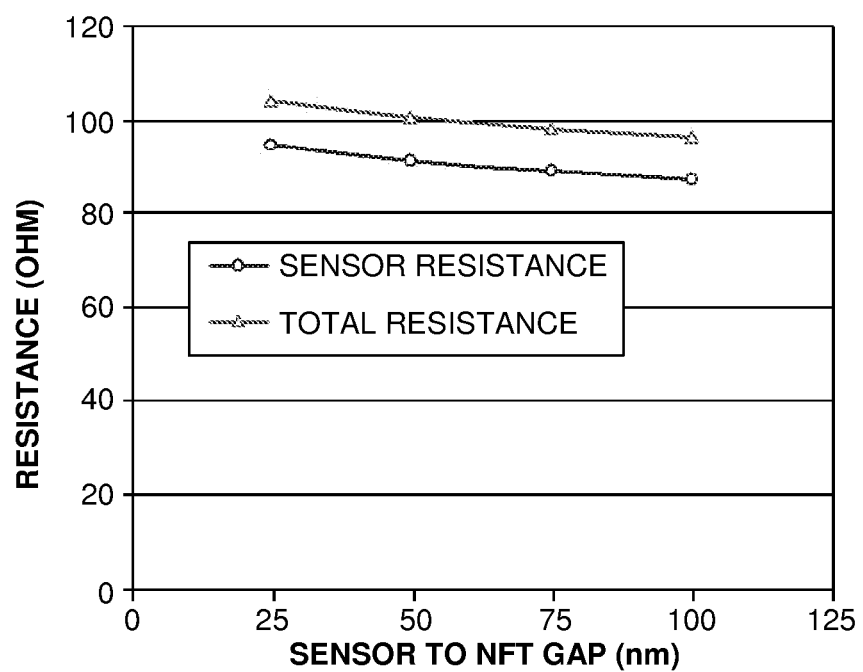

FIGS. 6A-6B are graphs illustrating analytical data related to the gap between a near-field transducer and a temperature sensor, according to embodiments of the invention. Both FIGS. 6A and 6B illustrate temperature and electrical resistance according to the gap distance between the transducer 140 and the temperature sensor 145. The results were obtained with the thickness, height, and length of the sensor 145 set at 25 nm, 92 nm, and 0.8 μm respectively. The gap distance is shown in FIG. 3 by the dotted line labeled A-A and represents the distance between the two closest points (or planes) of the sensor 145 and the transducer 140 (e.g., the pole lip 315, dielectric 320, or the antenna 325).

In one embodiment, the sensor 145 and heat sink 305 may contact directly. However, in some cases, the sensor 145 and near-field transducer 140 may not directly contact. The metallic material of the temperature sensor 145 may interfere with the efficiency of the transducer 140 and hamper the function of the plasmonic device. Accordingly, in one embodiment, the sensor 145 and transducer 140 are separated by a non-magnetic, non-conductive material—e.g., cladding 252b—such that the temperature sensor 145 and transducer 140 do not directly contact. However, the farther the temperature sensor 145 is located from the transducer, the less sensitive it is to temperature fluctuations caused by the transducer 140.

FIG. 6A illustrates the negative effect of moving the temperature sensor 145 farther away from the transducer by increasing the gap distance. As the gap distance increases, the temperature of the sensor 145 decreases. Because the electrical resistance of the temperature sensor 145 corresponds to its temperature, the ability of the disk drive to correctly measure the temperature of the transducer 140 decreases as the gap distance increases.

In one embodiment, the gap distance between the near-field transducer 140 and the temperature sensor 145 is greater than 10 nm. In one embodiment, the gap distance is greater than 20 nm. In one embodiment, the gap distance is less than 100 nm. In one embodiment, the gap distance is between 10 and 50 nm. In one embodiment, the gap distance is between 15 and 35 nm. In one embodiment, the gap distance is between 20 and 30 nm, such as 25 nm.

FIG. 6B compares the total resistance of the sensor leads 260 and the sensor 145 to the resistance of only the sensor 145 at varying gap distances.

Figure 7A:
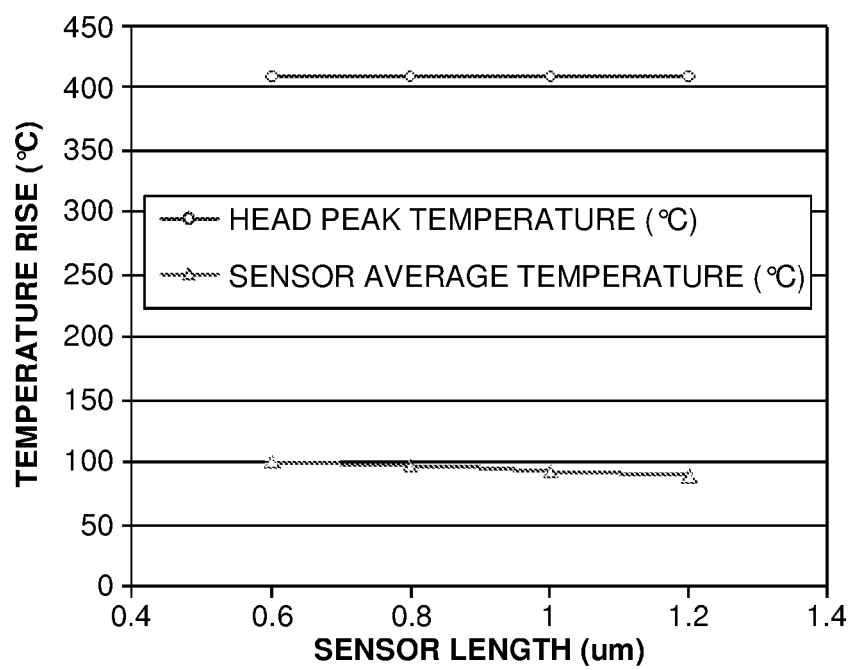
FIGS. 7A-7B are graphs illustrating analytical data related to the length of a temperature sensor, according to embodiments of the invention.
Figure 7B:
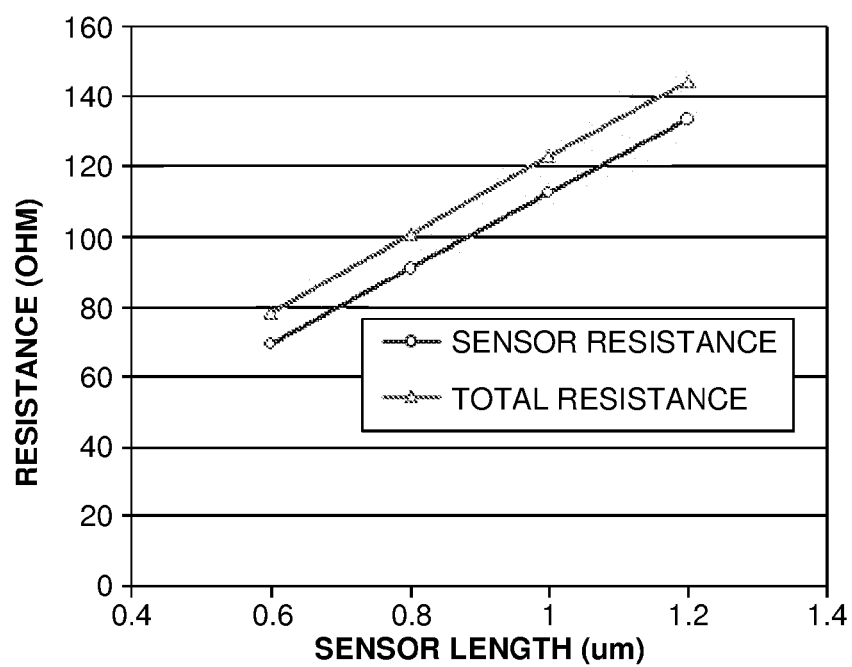

FIGS. 7A-7B are graphs illustrating analytical data related to the length of the temperature sensor 145, according to embodiments of the invention. The results were obtained with a gap distance of 50 nm and the thickness and height of the sensor 145 set at 25 nm and at 92 nm, respectively. FIG. 7A illustrates that varying the length of the temperature sensor 145 has little affect on the ability of the sensor 145 to detect the temperature of the transducer 140. That is, the length may be between 200 nm to 1400 nm. FIG. 7B illustrates the possible resistances that may be achieved with the lengths shown. Accordingly, a circuit designer may choose the resistance (and corresponding length) that best matches the feedback circuit.

Figure 8A:
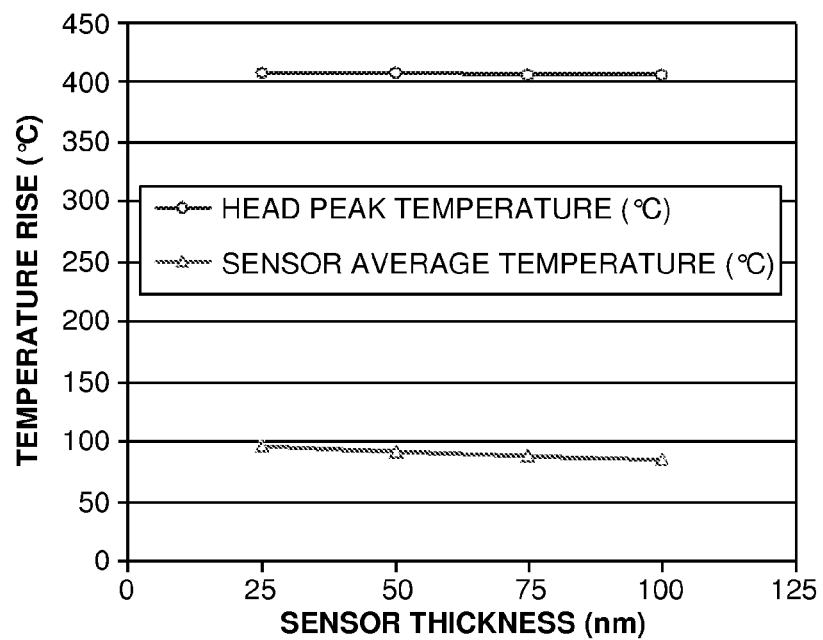
FIGS. 8A-8B are graphs illustrating analytical data related to the thickness of a temperature sensor, according to embodiments of the invention.
Figure 8B:
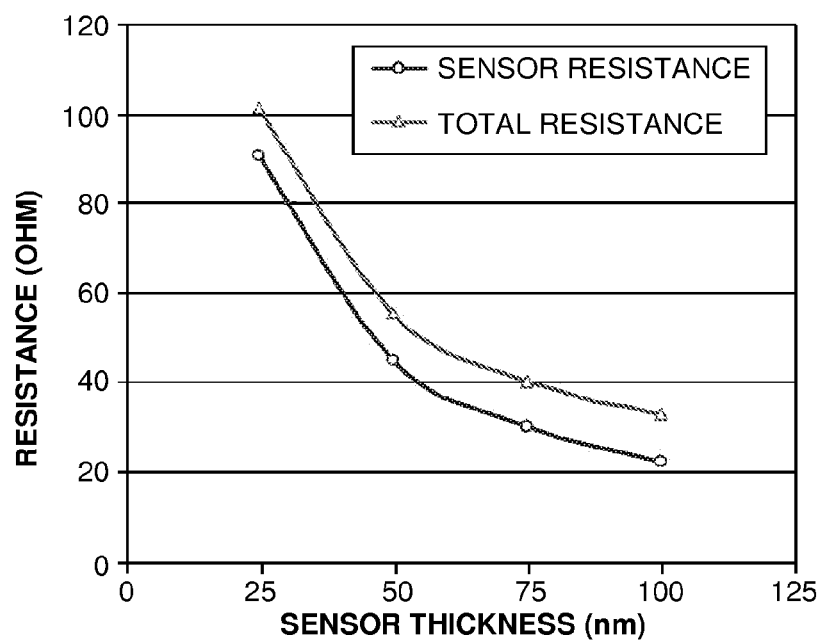

FIGS. 8A-8B are graphs illustrating analytical data related to the thickness of a temperature sensor, according to embodiments of the invention. The measurements were taken with a gap distance of 50 nm and the length and height of the sensor 145 set at 0.8 µm and at 92 nm, respectively. As with length, FIG. 8A illustrates that varying the thickness of the temperature sensor 145 has little affect on the ability of the sensor 145 to detect the temperature of the transducer 140. FIG. 8B illustrates the possible resistances that may be achieved with the thicknesses shown.

In one embodiment, the thickness of the temperature sensor 145 is between 10 and 50 nm, the height is between 50 and 150 nm, and the length is between 0.7 and 0.9 µm. In another embodiment, the thickness of the temperature sensor 145 is between 15 and 35 nm, the height is between 80 and 110 nm, and the length is between 0.75 and 0.85 µm.

In one embodiment, the thickness of each of the sensor leads 260 is between 10 and 50 nm, the height is between 500 and 1000 nm, and the length is between 300 and 600 nm. In another embodiment, the thickness of each of the sensor leads 260 is between 20 and 40 nm, the height is between 600 and 800 nm, and the length is between 350 and 550 nm.

Thermal Coupling the Near-Field Transducer and the Temperature Sensor

Figure 9A:
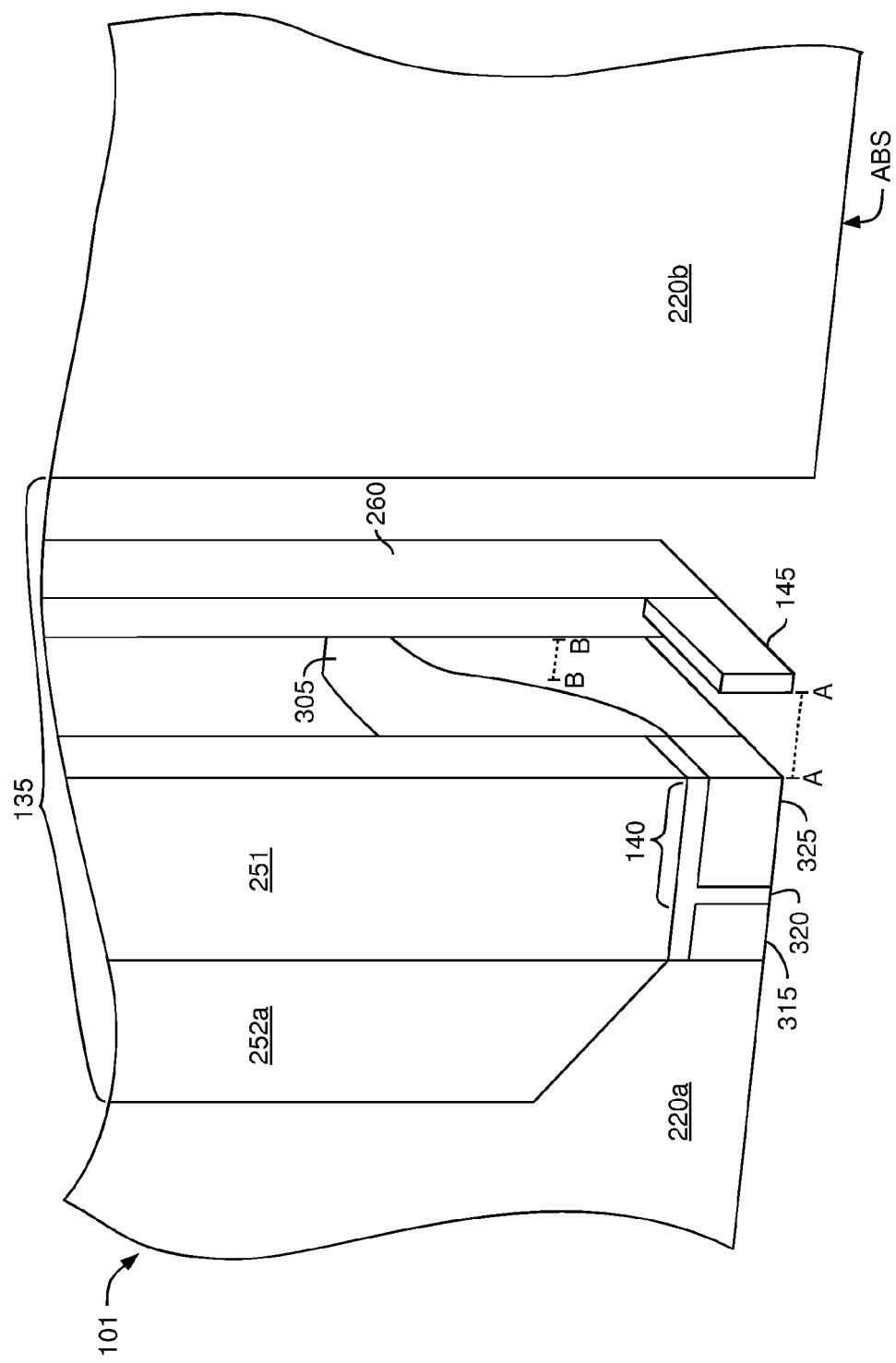
FIGS. 9A-9B are cross-sectional schematic diagrams of a TAR enabled head, according to embodiments of the invention.
Figure 9B:
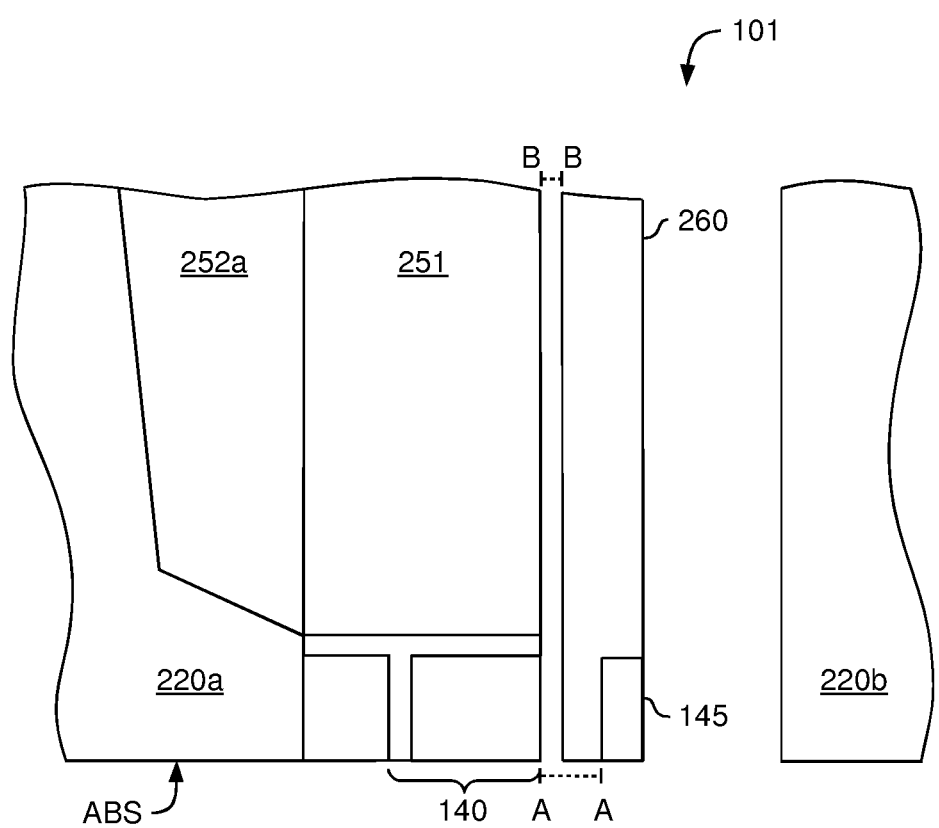

FIGS. 9A-9B are cross-sectional schematic diagrams of a TAR enabled head 101, according to embodiments of the invention. As shown, this portion of the head 101 includes the waveguide 135 but with cladding 252b (and any cladding on the back-side of the head 101) removed to better illustrate the details of the temperature sensor 145, sensor lead 260, and heat sink 305. Although the heat sink 305 is shown as being directly coupled to the near-field transducer 140, in another embodiment, the transducer 140 may only be thermally coupled to the heat sink 305 but not physically connected. Because FIG. 9A is a cross-section of head 101, in one embodiment, there is another heat sink located opposite the heat sink 305 depicted.

As discussed in the embodiment associated with FIG. 3, a constant voltage (or a constant current) may be applied across the sensor 145. The resulting current can be plotted according to time to determine changes in the resistance of the temperature sensor 145. This change may be used to increase or decrease the radiation emitted from the laser that provides the power to the near-field transducer 140 for heating the magnetic media.

To electrically connect the temperature sensor 145 to a resistance sensing circuit (e.g., laser driver 150), the head 101 may include two sensor leads 260 connected to opposite sides of the temperature sensor 145. For clarity, the sensor lead located opposite the sensor lead 260 depicted in FIG. 9A is omitted. In one embodiment, the electrical resistance of the material comprising the sensor lead 260 is less dependent on temperature than the material used for the temperature sensor 145. That is, the electrical resistance of the sensor lead 260 is less sensitive to temperature fluctuations than the temperature sensor 145. In one embodiment, the sensor leads 260 may comprise Ru, Cu, Ta, Cr, or combinations thereof. However, in another embodiment, the material of the sensor lead 260 may be the same as the material used for the temperature sensor 145. Although not shown in FIG. 9A, the sensor lead 260 may extend away from the ABS until the pad 260 reaches a connector pad located at the top of the head 101. The pads 260 may flare or widen and include Cu or Ta leads that are used to electrically connect the sensor lead 260 to the connector pads.

In FIG. 9A, the core 251 terminates at the near-field transducer 140. The transducer 140 includes an antenna 325, dielectric 320, and the pole lip 315. The antenna 325 may be Cu, Au, Ag, or alloys thereof. In one embodiment, the antenna 325 is the same material as the heat sink 305—e.g., gold. The material and the functionality for the dielectric 320, cladding 252, and the pole lip 315 may be the same as described above in FIG. 3.

FIG. 9A differs from the write head 101 shown in FIG. 3 in that the distance between at least some portion of the sensor lead 260 and the heat sink 305 is less than the distance between the sensor 145 and the transducer 140. As shown, the sensor lead 260 is thicker than the temperature sensor 145 which results in the distance B-B (i.e., the distance between the sensor lead 260 and the heat sink 305) being shorter than distance A-A (i.e., the distance between the temperature sensor 145 and the antenna 325). The distances B-B and A-A each extend in the same direction that is perpendicular to the surfaces of the heat sink 305 and antenna 325 that face the temperature sensor 145 and sensor lead 260. Thus, as measured along this direction (i.e., the thickness direction), the sensor lead 260 is closer to the heat sink 305 and the transducer 140 than is the temperature sensor 145.

Altering either the dimensions or the placement of the sensor lead 260 may increase the thermal coupling between the near-field transducer 140 and the temperature sensor 145. As mentioned previously, the near-field transducer 140 and the temperature sensor 145 may be separated in the write head 101 by an insulative material. The thermal conductivity of this insulative material determines, at least in part, how quickly the temperature of the temperature sensor 145, and thus, the sensor's resistance, represents the temperature of the near-field transducer 140. Because the thermal conductivity of many electrically insulative materials is low (a poor thermal conductor), there may exist a time delay that is dependent on the thermal conductivity of the insulative material. That is, materials that are poorer thermal conductors may cause a greater time delay than materials that are better thermal conductors.

In addition to being thermally coupled to the near-field transducer 140 via the insulative material, the heat emitted from the transducer 140 may also transfer to the temperature sensor 145 via a thermal path that includes the heat sink 305 and the sensor lead 260. That is, heat from the transducer 140 travels to the heat sink 305, from the heat sink 305 to the sensor lead 260 via the insulative material, and from the sensor lead 260 to the temperature sensor 145. Shrinking the distance between the sensor lead 260 and the heat sink 305 (i.e., distance B-B) may advantageously mitigate the timing delay from the poor thermal conductivity of the insulative material.

As discussed previously, the efficiency of the transducer 140 may decrease as the gap distance A-A decreases. However, the same deleterious effects may not occur if the sensor lead 260 is moved closer to the heat sink 305. Thus, if the sensor lead 260 is moved closer to the heat sink 305, the thermal coupling between the near-field transducer 140 and the temperature sensor 145 may be improved without affecting or substantially affecting the efficiency of the transducer 140. In this manner, the measured resistance of the temperature sensor 145 may represent the current temperature of the transducer 140 quicker relative to the write head 101 shown in FIG. 3. As a result, the laser driver or sensing circuit coupled to the sensor leads 260 may then have more up-to-date information about the current temperature of the near-field transducer 140 which can then be used to control the transmission power of the laser and the temperature of the transducer with increased precision.

FIG. 9B illustrates another cross-section of the head 101. As shown, the sensor 145 is separated from the transducer 140 (and the heat sink behind the transducer 140) by distance A-A. The sensor lead 260 is separated from the transducer 140 and the heat sink by distance B-B. In one embodiment, the gap distance A-A between the near-field transducer 140 and the temperature sensor 145 is greater than 10 nm or 20 nm but is less than 150 nm. In another embodiment, the gap distance is between 15 and 35 nm, 20 and 30 nm, or 50 and 100 nm.

Generally, the distance B-B may be set to be smaller than the gap distance A-A. In one embodiment, the distance B-B may be set based on the gap distance A-A. For example, the distance B-B may be a defined portion or percentage of the gap distance—e.g., the distance B-B is half of the distance A-A. Alternatively, the distance B-B may be independent of the distance A-A. For example, the distance B-B may range anywhere from 0-100 nm.

As shown in FIG. 9B, the dimensions of the sensor lead 260 may not vary as the sensor lead 260 extends towards the surface of the head 101. However, in other embodiments, the shape of the sensor lead 160 may vary as the sensor lead 260 extends away from the ABS or be based on the shape of the heat sink. For example, the dimensions (e.g., the cross sectional area of the pad 260 parallel with the ABS) may expand or flare as the pad 260 extends away from the ABS. Moreover, the shape of the sensor lead 260 closest to the heat sink may mirror the shape of the heat sink. For example, only the portion of the sensor lead 260 directly across from the heat sink 305 may protrude towards the heat sink while the sensor lead that is not directly across from the heat sink has the same thickness as the temperature sensor 145. In any case, at least some portion of the sensor lead 260 extends closer to the transducer 140 (in a thickness direction) than the temperature sensor 145. This may improve the thermal coupling between the temperature sensor 145 and the near-field transducer 140.

Although FIGS. 9A and 9B illustrate only one of the sensor leads 260 being closer to the heat sink and the transducer 140 than the temperature sensor 145, in one embodiment, both sensor leads 260 may be closer to these elements than the sensor 145. That is, the sensor lead opposite of the one depicted may also be closer to the other heat sink (in the thickness direction) than the transducer 140. Thus, by shifting both sensor leads 260 closer to the respective heat sinks, the head 101 may improve the thermal coupling and reduce the timing delay. For example, both sensor leads 260 may be spaced the distance B-B from the respective heat sinks 305. However, in other embodiments, the sensor leads 260 may be spaced differently relative to each other.

Figure 10A:
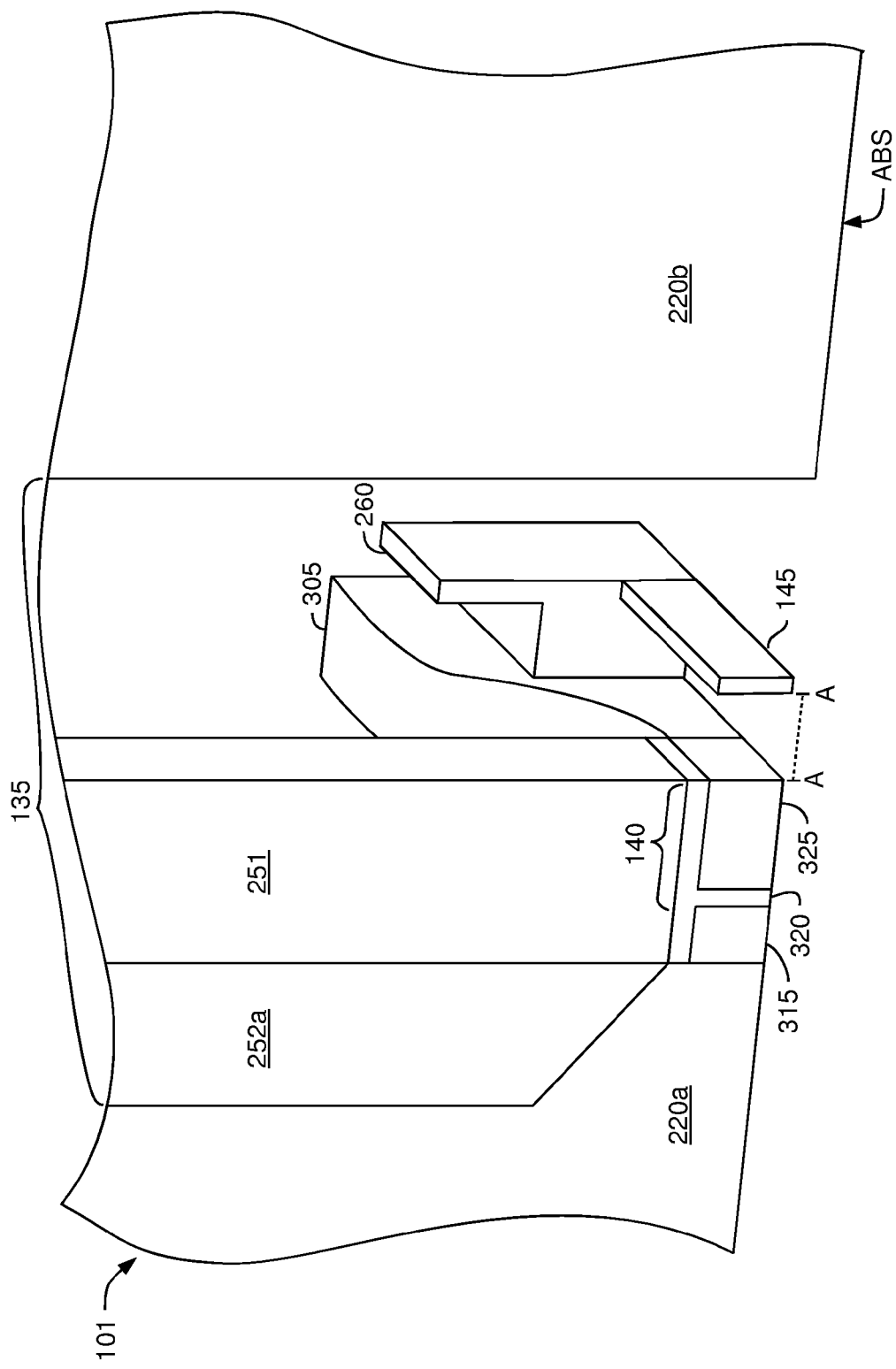
FIGS. 10A-10B are cross-sectional schematic diagrams of a TAR enabled head, according to embodiments of the invention.
Figure 10B:
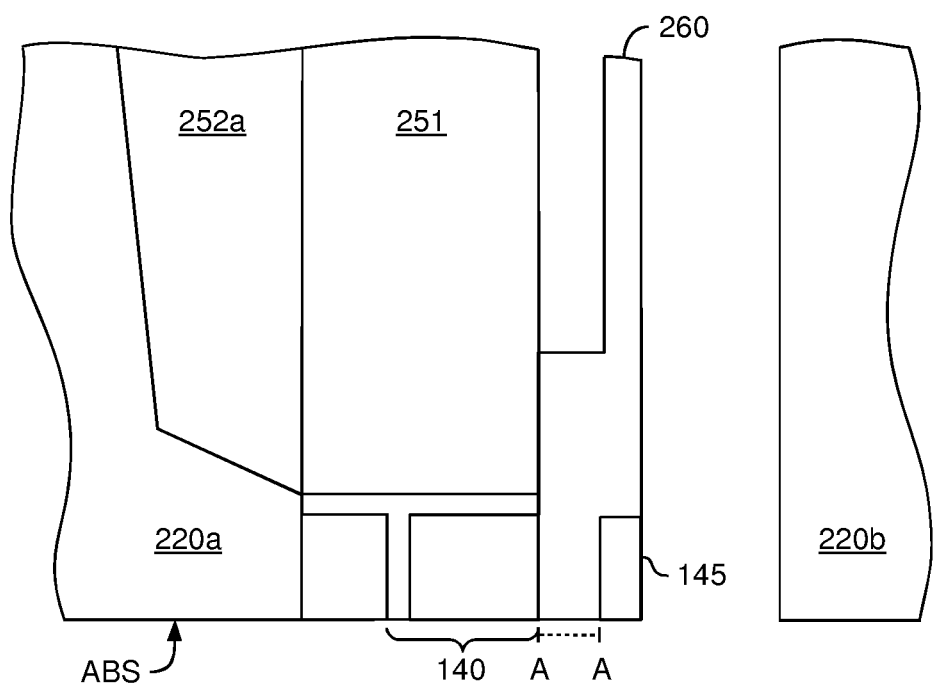

FIGS. 10A-10B are cross-sectional schematic diagrams of a TAR enabled head 101, according embodiments of the invention. In contrast to the head 101 in FIGS. 9A-9B, the sensor lead 260 in FIGS. 10A-10B directly contacts the heat sink 305. Doing so may increase the thermal coupling between the temperature sensor 145 and the transducer 140 relative to the embodiments shown in FIGS. 3 and 9A. Specifically, directly contacting the sensor lead 260 and the heat sink 305 results in the thermal energy being able to flow between these elements without passing through the insulative material. For example, sensor lead 260 and heat sink 305 may be made of materials with high thermal conductivities, and thus, the thermal energy emitted by the transducer 140 may affect the resistance of the temperature sensor 145 sooner than if the sensor lead 260 and the heat sink 305 were separated by the insulative material.

As shown in FIG. 10A, the sensor lead 260 contacts only a portion of the heat sink 305. However, the size of the contact area may vary—i.e., the sensor lead 260 and heat sink 305 may have a contact area that is smaller or larger than the one shown. Moreover, in one embodiment, contacting the pad 260 and the heat sink 305 also electrically connects these two elements. However, to prevent current from flowing through the transducer 140 instead of the temperature sensor 145, in one embodiment, only one of the sensor leads 260 directly contacts the heat sink 305. That is, the sensor lead opposite of the sensor lead 260 depicted may not directly contact a heat sink opposite of the heat sink 305 depicted. Accordingly, electrically connecting only one sensor lead 260 to only one heat sink 305 does not result in a sensing current from the laser driver flowing through the transducer 140—e.g., the antenna 325. Moreover, the heat sink 305 may be electrically insulated from any other node that may divert the sensing current from the current path shown in FIG. 5 where the current flows from one sensor lead 260a, through the sensor 145, and through the other sensor lead 260b. Although not shown in FIG. 10A, the sensor lead 260 may extend away from the ABS until the pad 260 reaches a connector pad located at the top of the head 101.

Even though the sensor lead opposite of the one depicted may remain electrically disconnected from a heat sink to prevent, in one embodiment this sensor lead could be spaced proximate to a heat sink as shown in FIGS. 9A-9B. Stated differently, the head may be designed such that the other sensor lead is spaced closer to the heat sink 305 and transducer 140 than is the temperature sensor 145. Thus, one sensor lead directly contacts the heat sink 305 while the other sensor lead 260 is shifted to be closer to the another heat sink as shown previously. Doing so may further increase the thermal coupling between the transducer 140 and the sensor 145.

FIG. 10B illustrates an embodiment where at least a portion of the sensor lead 260 extends in the thickness direction to contact a surface of the heat sink 305 that is co-planar with the surface of the transducer 140 that faces the temperature sensor 145. In addition, the temperature sensor 145 remains separated by distance A-A from the near-field transducer 140. Moreover, the sensor lead 260 may be shaped such that the pad 260 mirrors the shape of the surface of the heat sink 305 which it contacts. In one embodiment, however, the sensor lead 260 is offset, in the length direction, from the contact interface between the heat sink 305 and the antenna 325 so that the material of the sensor lead 260 does not harm the efficiency of the plasmonic transducer 140.

Figure 11A:
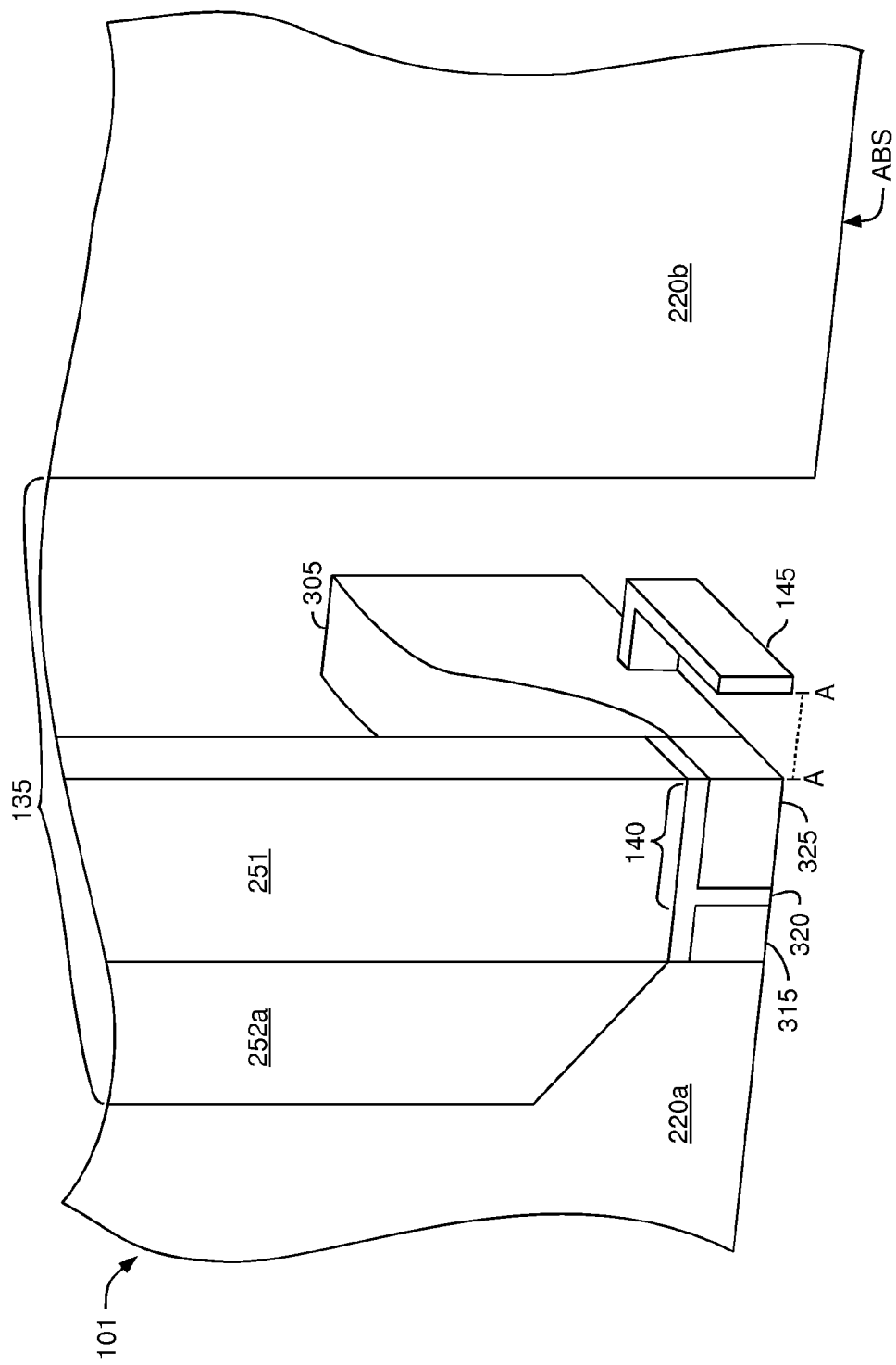
FIGS. 11A-11B are cross-sectional schematic diagrams of a TAR enabled head, according embodiments of the invention.
Figure 11B:
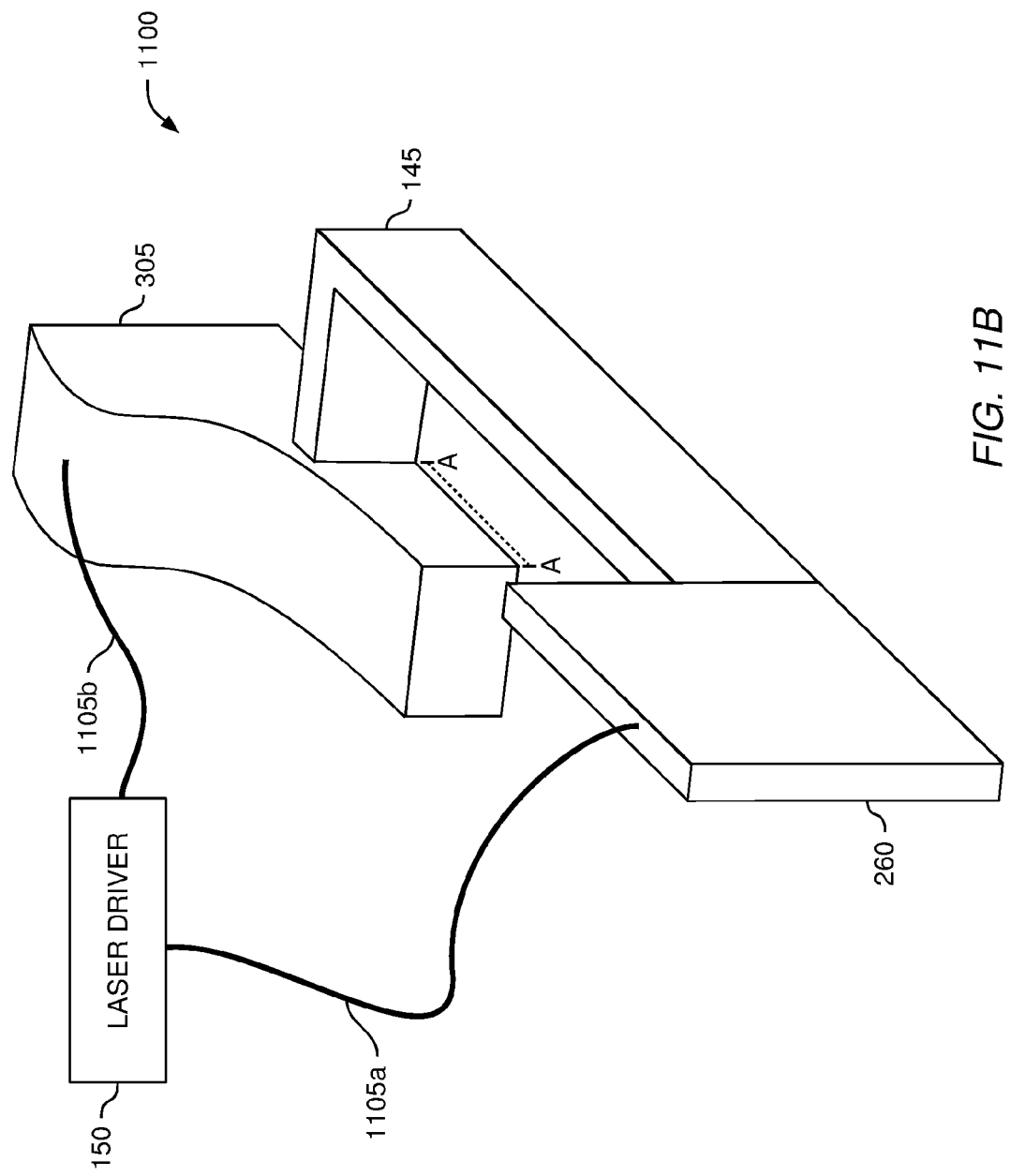

FIGS. 11A-11B are schematic diagrams of a TAR enabled head 101, according embodiments of the invention. As shown, FIG. 11A illustrates a write head 101 where at least one of the sensor leads 260 is omitted. Instead, the temperature sensor 145 is directly connected to the heat sink 305. Thus, instead of relying on a thermal conduction path where thermal energy flows from the heat sink 305, to the sensor lead 260, and to the sensor 145 as shown in FIG. 10A, the sensor 145 is thermally coupled to the near-field transducer 140, at least in part, by heat flowing from the heat sink 305 directly to the sensor 145.

Moreover, the heat sink 305 may be used as part of the electric path that carries the sensing circuit from the laser driver to the temperature sensor 145. FIG. 11B illustrates a simplified system 1100 where only the heat sink 305, temperature sensor 145, and one of the sensor leads 260 is shown. Instead of using two sensor leads 260 to carry the sensing current, the write head is fabricated such that the heat sink 305 is electrically coupled to the laser driver 150 (or other sensing circuit). Thus, current flows through the heat sink 305, through the temperature sensor 145, and through sensor lead 260 that is opposite the sensor lead shown in FIG. 10A. The electrical connections 1105A-1105B may include other electrically conductive elements in the write head, one or more connector or bonding pads, and other wires or traces needed to electrically couple the laser driver 150 to the temperature sensor 145. In this manner, the heat sink 305 may be used in lieu of one of the sensor leads to conduct the sensing current. In addition, by using at least one sensor lead 260 (instead of connecting both ends of the sensor 145 to the two heat sinks 305) the sensing current flows through the sensor 145 rather than through the antenna of the transducer.

Although temperature sensor 145 may contact the heat sink 305 in any manner, as shown here, the temperature sensor 145 is offset by the distance A-A, in the length direction, from the interface between the heat sink 305 and the transducer (not shown). Accordingly, the temperature sensor 145 is directly coupled to the heat sink 305, which may improve the thermal coupling, but the material of the temperature sensor 145 may be far enough away from the transducer 140 so as to not substantially affect the plasmonic efficiency of the near-field transducer. That is, the distance A-A may be use to offset the temperature sensor 145 in both the thickness direction and length direction from the elements of the near-field transducer.

Figure 12:
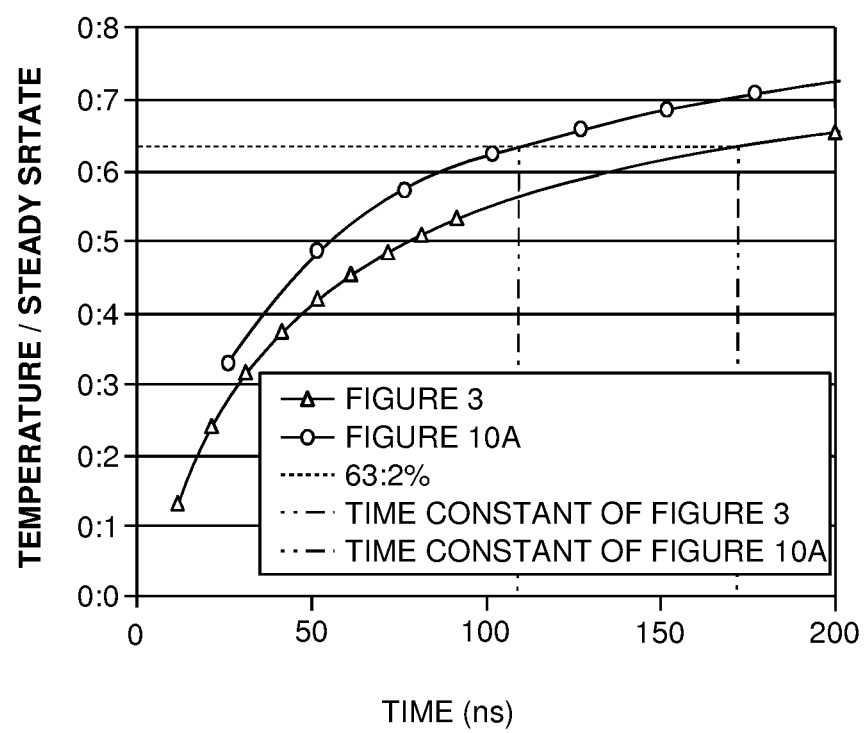
FIG. 12 is a graph illustrating the response time of the temperature sensor, according to one embodiment of the invention.

FIG. 12 is a graph illustrating the response time of the temperature sensor, according to one embodiment of the invention. Specifically, FIG. 12 compares the time constant of the embodiment shown in FIG. 3 to the time constant of the embodiment shown in FIGS. 11A-11B where one of the sensor leads directly contacts the heat sink. As used here, the time constant is the amount of time needed before the temperature of the sensor reaches 63.2% of the sensor's steady state temperature. Assume at time 0 that the temperature of the transducer changes. Using the thermal paths discussed earlier, the heat emitted from the transducer travels to the temperature sensor, affecting its resistance. The laser driver then correlates the measured resistance of the temperature sensor to a temperature of the near-field transducer. The dotted lines indicate when the respective temperature sensors reach 62.3% of their steady state temperatures—i.e., the time constant. Thus, the time constant is an indicator of how quickly the write heads of FIGS. 3 and 11A respond to changes in the temperature of the near-field transducer. As this graph illustrates, the time constant for the embodiment shown in FIG. 11A, where the sensor lead directly contacts the heat sink, is more than 50 ns faster than the embodiment shown in FIG. 3.

CONCLUSION

TAR enable write heads may use a plasmonic device (e.g., a transducer) which uses electromagnetic energy generated from a laser to heat magnetic media. However, as the temperature of the plasmonic device rises, the likelihood of stressing the material of the device or other materials of the head near the plasmonic device increases. Accordingly, the write head may include a temperature sensor proximate to the plasmonic device to control the temperature. In one embodiment, the resistance of the temperature sensor may change according to the temperature of the plasmonic device. Accordingly, the write head may include, or be coupled to, a sensing circuit which measures the resistance of the temperature sensor. Based on the measured resistance of the temperature sensor, the sensing circuit may adjust the power of the laser, and thus, prevent the stressing of the materials. In one embodiment, the thermal coupling between the temperature sensor and a heat sink connected to the plasmonic device may be improved by moving elements associated with the sensing circuit closer to the heat sink.

While the foregoing is directed to embodiments of the present invention, other and further embodiments of the invention may be devised without departing from the basic scope thereof, and the scope thereof is determined by the claims that follow.

What is claimed is:
1. A head of a disk drive, comprising:
an optical transducer configured to heat a magnetic media proximate to the head;
a first heat sink configured to transfer heat away from the optical transducer;
a temperature sensor configured to thermally couple to the optical transducer, wherein the temperature sensor and the optical transducer are spaced apart by a first distance along an axis that extends between the temperature sensor and the optical transducer, wherein the first distance between the temperature sensor and the optical transducer is between 5 and 150 nm; and
a first lead connected to the temperature sensor, wherein the first lead is configured to conduct a current flowing through the temperature sensor, and wherein the first lead either (i) contacts the first heat sink or (ii) is separated from the first heat sink by a second distance along the axis, wherein the second distance is shorter than the first distance.

2. The head of claim 1, wherein the first lead is connected to a first end of the temperature sensor, the head further comprising:
a second lead connected to a second end of the temperature sensor opposite of the first end, wherein the current flows through the second lead.

3. The head of claim 2, wherein the first lead contacts the first heat sink, and wherein the second lead does not contact a second heat sink located opposite of a side of the optical transducer that faces the first heat sink.

4. The head of claim 2, further comprising connective elements configured to couple the first and second leads to a sensing circuit that measures a resistance of the temperature sensor and adjusts the temperature of the optical transducer based on the measured resistance.

5. The head of claim 1, wherein the first lead is separated from the first heat sink by the second distance along the axis, wherein an insulative material is between the first heat sink and the first lead.

6. The head of claim 1, wherein the first lead comprises a different material from a material of the temperature sensor, wherein the electrical resistance of the material of the first lead changes less based on temperature than a material of the temperature sensor.

7. The head of claim 1, wherein the temperature sensor comprises at least one of Ta, Pt, Au, Rh, NiFe, and combinations thereof and wherein the first lead comprises at least one of Ru, Cu, Ta, Cr and combinations thereof.

8. A method, comprising:
transmitting optical energy from a laser to an optical transducer located in a head of a disk drive;
measuring an electrical resistance of a temperature sensor thermally coupled to the optical transducer using a first lead connected to the temperature sensor, wherein the electrical resistance correlates to a temperature of the sensor, wherein the temperature sensor and the optical transducer are spaced apart by a first distance along an axis that extends between the temperature sensor and the optical transducer, wherein first distance is between 5 and 150 nm, and wherein the first lead either (i) contacts a first heat sink that transfers heat away from the optical transducer or (ii) is separated from the first heat sink by a second distance along the axis, wherein the second distance is shorter than the first distance; and
adjusting the optical energy transmitted by the laser based on the measured electrical resistance.

9. The method of claim 8, wherein the first lead is thermally coupled to the first heat sink such that heat emitted from the optical transducer flows through the first heat sink and first lead to the temperature sensor, thereby changing the electrical resistance of the temperature sensor.

10. The method of claim 8, wherein the first lead is connected to a first end of the temperature sensor, the head comprising:
a second lead connected to a second end of the temperature sensor opposite of the first end, wherein measuring the electrical resistance comprises generating a current through the first and second leads and the temperature sensor.

11. The method of claim 10, wherein the first lead contacts the first heat sink, and wherein the second lead does not contact a second heat sink located opposite of a side of the optical transducer facing the first heat sink.

12. The method of claim 10, wherein the head comprises connective elements configured to couple the first and second leads to a sensing circuit that measures the electrical resistance of the temperature sensor.

* * * * *

UNITED STATES PATENT AND TRADEMARK OFFICE
CERTIFICATE OF CORRECTION

PATENT NO. : 8,705,323 B2  
APPLICATION NO. : 13/725140  
DATED : April 22, 2014  
INVENTOR(S) : John T. Contreras et al.

It is certified that error appears in the above-identified patent and that said Letters Patent is hereby corrected as shown below:

In the Specification:

Column 7, Line 6, delete "51" and insert --S1-- therefor.

Signed and Sealed this  
Eighth Day of July, 2014

Michelle K. Lee  
*Deputy Director of the United States Patent and Trademark Office*